Figure 1:
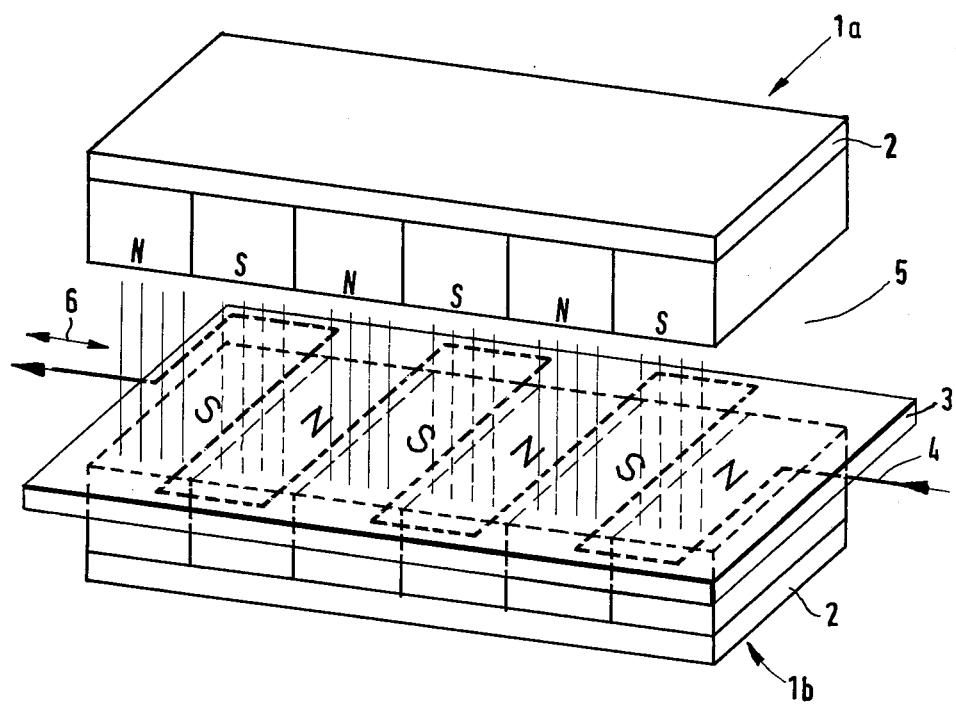

United States Patent [19]

Euer et al.

[11] 4,065,974

[45] Jan. 3, 1978

[54] SPRING SYSTEM COMPRISING AN ADJUSTABLE SPRING

[75] Inventors: Hartmut Euer, Gauting; Gerhard Bartek, Munich, both of Germany

[73] Assignee: Apparatebau Gauting GmbH, Gauting, Germany

[21] Appl. No.: 633,846

[22] Filed: Nov. 20, 1975

[30] Foreign Application Priority Data

Nov. 22, 1974 Germany .............................. 2455355
May 13, 1975 Germany .............................. 2521175

[51] Int. Cl.$^2$ ........................................... G01D 11/10
[52] U.S. Cl. .................................. 73/430; 73/432 A; 73/432 R
[58] Field of Search ............... 73/430, 432 A, 432 R; 310/12, 13, 268, 93; 188/267; 179/115.5 PV

[56] References Cited

U.S. PATENT DOCUMENTS

| | | | |
|---|---|---|---|
| 277,069 | 5/1883 | Seeley | 310/268 |
| 2,350,741 | 6/1944 | Ford | 73/432 A |
| 2,353,617 | 7/1944 | Lamb | 73/430 |
| 2,886,302 | 5/1959 | Coffman et al. | 73/430 |
| 3,333,124 | 7/1967 | Francis et al. | 310/268 |
| 3,348,086 | 10/1967 | Monma | 310/268 |
| 3,387,499 | 6/1968 | Bruderlein | 310/93 |
| 3,416,535 | 12/1968 | Kalthoff et al. | 310/13 |
| 3,525,007 | 8/1970 | Henry-Baudot | 310/268 |
| 3,786,685 | 1/1974 | Lademann et al. | 73/430 |
| 3,924,537 | 12/1975 | Matsui et al. | 310/13 |

OTHER PUBLICATIONS

Halliday & Resnik; Physics Part II; p. 825 (1962).

*Primary Examiner*—Anthony V. Ciarlante
*Attorney, Agent, or Firm*—Haseltine, Lake & Waters

[57] ABSTRACT

A spring system has an adjustable spring force and includes at least one magnet. The magnet has a magnetic field, and at least one conductor passing direct current is disposed in the magnetic field. The magnet is formed by a number of pole pairs disposed along the path of displacement of the conductor, and each of the pole pairs encloses an air gap; the current-carrying conductor is a wire.

4 Claims, 6 Drawing Figures

SPRING SYSTEM COMPRISING AN ADJUSTABLE SPRING

In measuring instruments, there have hitherto mainly been employed mechanical springs, and in the case of measuring systems having a linearly acting spring force, mechanical compression and tension springs are above all employed. In measuring systems having a torsional action, mechanical spiral springs or torsion bars are preferably used, and in some cases combinations of compression and tension springs with a lever arm acting on the rotary system.

Mechanical springs have the following disadvantages. They involve high cost of manufacture and fitting. In addition, they are susceptible to breakdown under the action of mechanical oscillations. Also, they have a tendency to become unstable in the region of the zero point, due to influences in the region in which the spring element is gripped. On over-rotation of the spring element, there is a danger of the spring properties being modified. On the other hand, intentional modification of the spring properties for the purpose of changing over the measuring range is possible only with limited accuracy, and then only at high cost of construction. Finally, mechanical springs tend to undergo variations of their spring properties in the event of temperature fluctuations.

The invention has for its object to provide a spring system in which the aforesaid disadvantages are substantially eliminated.

In accordance with the invention, this object is achieved by at least one magnet, in the magnet field of which there is situated at least one current conductor through which a current is passed and which is displaceable in relation to the said magnet.

An interaction exists between the magnetic field of the magnet and the magnetic field generated by the current-carrying conductor, the system tending in itself to hold the magnet and the conductor in a particular position or to move the two into a particular relative position. Any variation of the relative position can take place only with the application of a positive or a negative force, which can then be utilised as the spring force. The spring force of such an electro-magnetic spring system can readily be varied, for example for the purpose of changing over the measuring range, by variation of the current flowing through the conductor. Another possible method resides in varying the magnetic field of the magnet, provided that the latter is an electromagnet.

The magnet is advantageously formed by a number of pole pairs disposed along the path of displacement, which each enclose between them an air gap in which the current-carrying conductor is movably disposed.

The current-carrying conductor may be, for example, a wire bent in undulating form in the direction of displacement, of which the half-wire spacing is substantially equal to the corresponding distance between adjacent pole pairs. The direction of the magnetic fluxes between the poles of adjacent pole pairs must be opposite to one another.

It is also possible for the current-carrying conductor to be a wire which is so coiled that it forms a number of windings disposed one behind the other in the direction of displacement, equal to the number of pole pairs, which windings comprise at least one turn and have substantially the same cross-section and spacing as the pole pairs, and for the winding direction of each winding to be such that the magnetic flux generated by the current in the wire in each winding is of the same direction as the magnetic flux between the pole pair with which the winding is associated.

The dependence of the spring force upon the deflection can be varied and made, for example, linear, progressive or degressive, either by giving the coils a correspondingly non-uniform geometry or correspondingly distorting the field of the pole pairs.

For increasing the magnetic efficiency, it is desirable for the pole pairs on the two sides of the air gaps to be magnetically connected together by means of yoke plates.

There may be employed as the carrier for the wire a plate which is displaceable in the air gaps of the pole pairs. Preferably, this plate is formed with recesses in which the wire can be disposed. The plate should consist of non-magnetisable material. However, the material of the plate may be electrically conductive, in which case there are set up in the plate in the movement through the air gap eddy currents which result in a damping of the movement.

If it is desired to make the damping variable, the plate may be non-displaceably coupled to a further plate, which is also movably disposed in an air gap defined by at least one pole pair and which comprises a wire which forms with an electric resistor a damping circuit. The additional damping action can be varied by the choice of the resistor.

In order to eliminate temperature influences, there may be provided on the spring system a temperature sensor whose output signal is applied to a control circuit for the current of the current-carrying conductor, which control circuit compensates the variation of the spring characteristic in dependence upon the temperature by varying the current correspondingly in like sense.

If the spring system is to have a linear action, the pole pairs may be disposed on a linear displacement path.

If, on the other hand, the spring system is to have an action of torsional stiffness, the pole pairs may be disposed on a circular displacement path. In this case, it is desirable for the plate also to be made of circular form and to be arranged to rotate about an axis extending through the centre of the circuit or displacement path, in which case an outer ring-shaped portion of the plate is situated in the air gaps defined by the pole pairs.

If it is desired to apply the aforesaid variable damping in the last-described spring system having torsional stiffness, a particularly simple form of construction is possible in which there is also provided on the axis a damping system which is constructed in the same form as the spring system, except that the wire of the rotatable disc of the damping system is connected to a resistance which is variable in accordance with the desired damping, so as to form a damping circuit.

Figure 4:
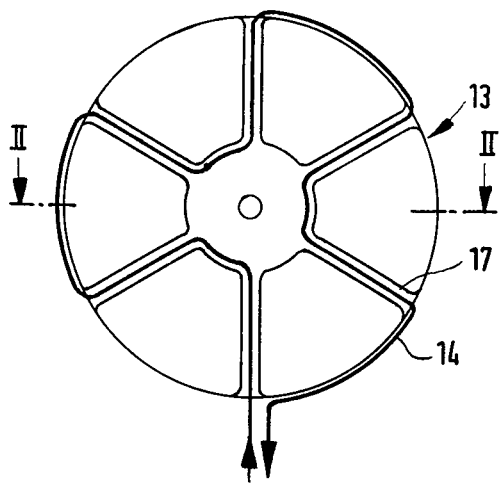
Figure 5:
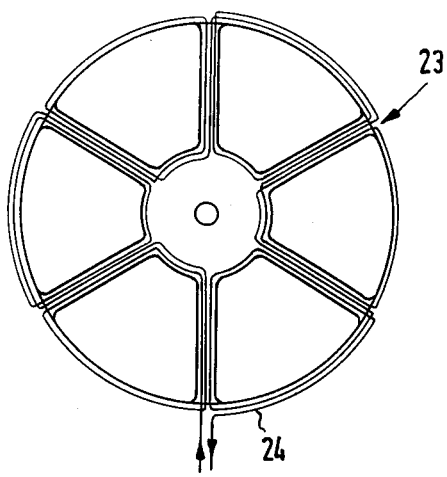
Figure 2:
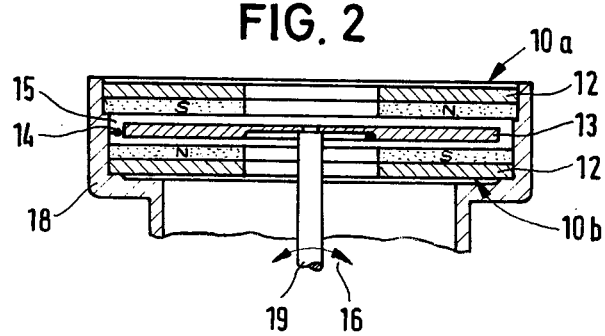
Figure 3:
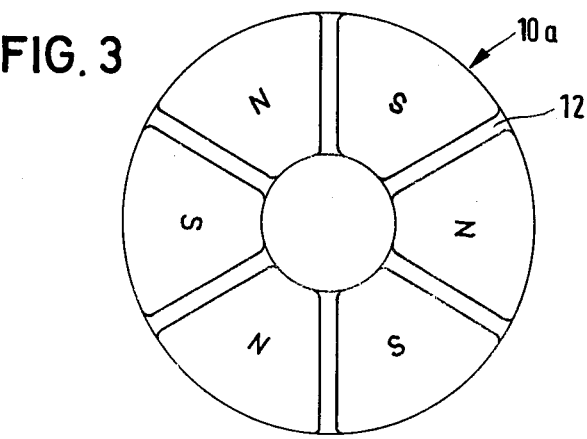
Figure 6:
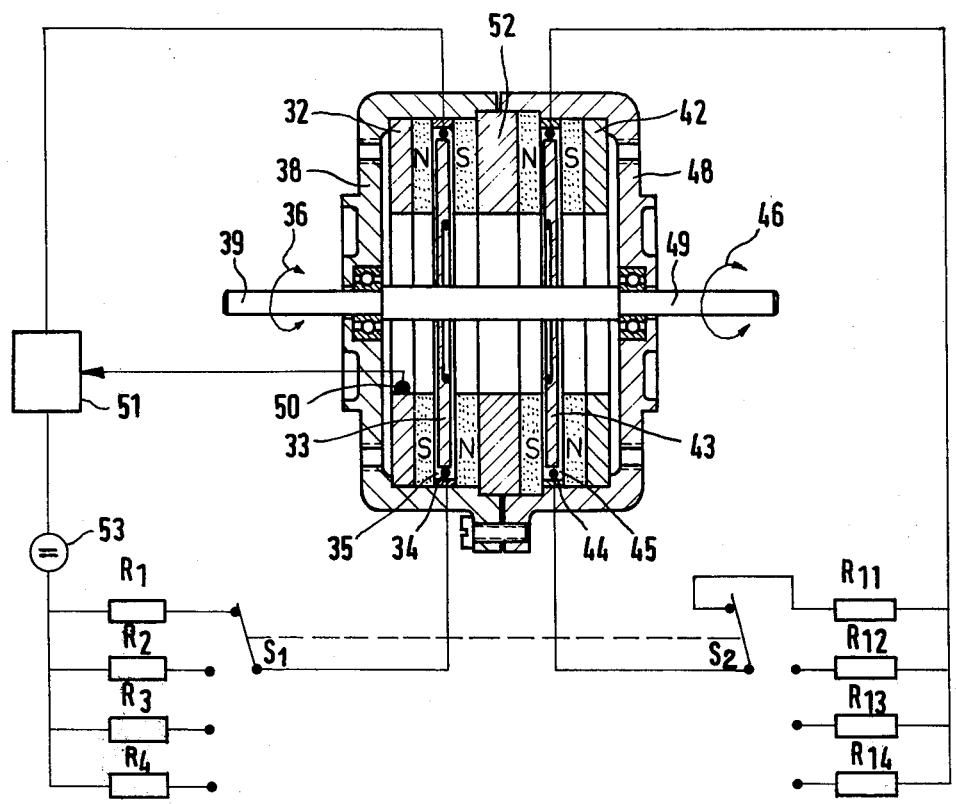

Embodiments of the invention are described in the following with reference to the drawings, in which:

FIG. 1 is a diagrammatic illustration in perspective of a linearly acting electromagnetic spring element, FIG. 2 is a section through a torsion spring system, FIG. 3 is a view on to the magnetic poles arranged in the form of a circle, with the yoke plate of the torsion spring system according to FIG. 2, FIG. 4 is a view of the carrier plate for the wire of the torsion spring system according to FIG. 2, FIG. 5 is a view of the carrier plate as in FIG. 1, but with a varied manner of winding of the wire, and FIG. 6 is a section through a torsion spring system having variable damping.

The electromagnetic linear spring system illustrated in FIG. 1 consists of two magnet blocks 1a, 1b enclosing between them an air gap 5. A carrier plate 3 for a wire 4 is so disposed in the air gap 5 as to be displaceable in the direction 6. A direct current is passed through the wire 4 in the direction of the arrow. Each of the two magnet blocks 1a, 1b comprises a number of magnet poles disposed one behind the other in the direction of displacement 6, which are denoted by N and S respectively in accordance with their polarity. In each instance, opposite poles are situated opposite one another at the air gap 5. The poles of each magnet block 1a, 1b are magnetically connected together by a yoke plate 2 consisting of magnetisable material. The wire 4 is bent into the form of rectangular waves, the half-wave spacing being equal to the width of the magnet poles in the direction of displacement 6.

The current flowing through the conductor 4 generates a magnetic field, the flux lines of which extend in opposite directions in adjacent half-waves of the conductor 4. The system also tends so to adjust itself that the flux lines between opposite poles of the two magnet blocks 1a, 1b and the flux lines of the half-waves of the conductor 4 are of like direction. This position of the carrier plate 3 will be termed the neutral position. Any attempt to deflect the carrier plate 3 in the direction of displacement 6 from the neutral position can take place only under the application of force. The greater the deflection, the greater is the spring force, that is to say, the force with which the system tends to return to its neutral position. It is obvious that the deflection can take place only within certain limits.

The plate 3 consists of a non-magnetisable material which may, however, be electrically conductive. In the latter case, any displacement of the plate 3 will be opposed by a damping resistance due to the known development of eddy currents.

The torsion spring system illustrated in FIG. 2 is based upon the same principle as the system according to FIG. 1. Two magnet blocks 10a, 10b are so disposed in a housing 18 as to form an air gap 15, in which a carrier plate 13 is so disposed as to be rotatable about a pin or shaft 19. The rotatability is indicated by the arrow 16. The carrier plate 13 carries a winding 14.

In FIG. 4, the carrier plate 13 is shown in a view from below. It will be seen that the carrier plate 13 is formed with a slot-like recesses 17 in which the wire 14 is disposed. Here again, the wire is bent in undulating form. In FIG. 2 the carrier plate 13 is shown in section along the line II—II in FIG. 4.

FIG. 3 shows the magnet block 10a as seen from below. The magnets denoted by N, S are disposed in a circle on a yoke plate 12.

In FIG. 5, there is shown a carrier plate 23 in which the wire 24 forms a number of series-connected windings. The winding direction is such that adjacent windings generate magnetic fields of opposite flux directions.

There is shown in FIG. 6 a torsion spring system having variable damping. The spring system on the left-hand side is here constructed on exactly the same principle as the spring system according to FIG. 2. There are provided in a first housing part 38 two magnet blocks having circularly arranged magnets N, S. Provided in an air gap situated between the magnet blocks is a carrier disc 33 for a wire 34. The carrier disc is mounted on a pin or shaft 39 which is rotatable in the direction indicated by the arrow 36. The left-hand magnet block comprises a yoke plate 32.

The damping system on the right-hand side is constructed in exactly the same form as the spring system on the left-hand side. Situated in a second housing part 48 are two magnet blocks comprising magnets N, S. A carrier plate 43 with a winding 44 is disposed in an air gap 45 situated between the magnet blocks. The carrier plate 43 is rotatable about a shaft 49 as indicated by the arrow 46, the shaft 49 being rigidly coupled to the shaft 39. The right-hand magnet block comprises a yoke plate 42. The right-hand magnet block of the spring system and the left hand magnet block of the damping system have a common yoke plate 52.

The winding 34 of the spring system is supplied from a direct-current source 53. Resistors $R_1$, $R_2$, $R_3$, $R_4$ of different values can be connected into the circuit by means of switch $F_1$, whereby the current is correspondingly varied. In this way, the spring force can be changed.

The winding 44 of the damping system forms with one of the resistors $R_{11}$, $R_{12}$, $R_{13}$, $R_{14}$ a damping circuit. The respective damping circuit may be adjusted by means of the switch $S_2$. By synchronisation of the switches $S_1$, $S_2$, the spring force and the damping can be simultaneously varied in like manner.

There is further situated in the spring system a temperature-measuring element 50 which signals to a control circuit 51 the temperature obtaining in the spring system. The control circuit 51 varies the current for the spring system in accordance with the temperature variations, so that the variations which are produced in the spring constant by the temperature variations are substantially compensated.

What is claimed is:

1. A spring system having an adjustable spring force comprising at least one magnet, said magnet having a magnetic field, at least one conductor passing direct current being disposed in said magnetic field, said conductor being displaceable relative to said magnet, said magnet being formed by a number of pole pairs disposed along the path of displacement of said conductor, each of said pole pairs enclosing an air gap, having a predetermined cross-section and a predetermined spacing from another of said pole pairs, said direct current carrying conductor displaceable in said air gaps being a wire bent substantially in undulative form in the direction of displacement, and coiled so as to form a number of windings disposed one behind the other in the direction of the displacement, said number of windings being equal to said number of pole pairs, each of said windings having at least one turn and having substantially the same cross-section and spacing from another of said windings as the cross-section and spacing of each of said pole pairs, first and second magnetic fluxes being generated by the direct current in said wire and by the magnetic pole pair having said wire disposed therebetween, respectively, said first and second magnetic fluxes being of equal directions, said second fluxes between poles of adjacent pole pairs being opposite to one another, the undulating wire having a half-wave spacing substantially equal to the spacing between adjacent pole pairs.

2. A spring system according to claim 1 wherein said magnet is formed by a number of poles, poles opposite one another forming one of said pole pairs and further comprising first and second yoke plates of magnetically conducting material, one half of said number of poles being disposed on one side of said air gaps and having first sides remote from said air gaps, said first yoke connecting said first sides, the other half of said number of poles being disposed on the other side of said air gaps and having second sides remote from said air gaps, said second yoke connecting said second sides.

3. A spring system according to claim 2, wherein the pole pairs are disposed on a linear displacement path.

4. A spring system according to claim 1 further comprising a temperature sensor having an output signal, control circuit means for controlling the current in said current-carrying conductor, the output signal of said temperature sensor being applied to said control circuit, said spring system having a temperature-dependent variable spring characteristic, said variable spring characteristic being compensated by a corresponding variation of the controlled current in a sense having an effect opposite to said temperature-dependent variable spring characteristic on said spring system.

* * * * *